United States Patent
Song

(10) Patent No.: US 10,011,301 B2
(45) Date of Patent: Jul. 3, 2018

(54) REAR FLOOR ARRANGEMENT STRUCTURE FOR VEHICLE

(71) Applicant: Hyundai Motor Company, Seoul (KR)

(72) Inventor: Won Ki Song, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 15/138,798

(22) Filed: Apr. 26, 2016

(65) Prior Publication Data

US 2017/0106908 A1    Apr. 20, 2017

(30) Foreign Application Priority Data

Oct. 14, 2015 (KR) .................. 10-2015-0143636

(51) Int. Cl.
| | |
|---|---|
| *B62D 21/15* | (2006.01) |
| *B62D 25/20* | (2006.01) |
| *B62D 29/04* | (2006.01) |
| *B62D 35/02* | (2006.01) |

(52) U.S. Cl.
CPC .......... *B62D 21/152* (2013.01); *B62D 25/20* (2013.01); *B62D 25/2027* (2013.01); *B62D 29/041* (2013.01); *B62D 29/046* (2013.01); *B62D 35/02* (2013.01); *Y02T 10/88* (2013.01)

(58) Field of Classification Search
CPC .... B62D 21/152; B62D 25/08; B62D 25/087; B62D 25/20; B62D 25/2027; B62D 29/001; B62D 29/041; B62D 43/10
USPC .............. 296/187.08, 187.11, 193.08
See application file for complete search history.

(56) References Cited

U.S. PATENT DOCUMENTS

| | | | |
|---|---|---|---|
| 8,991,900 B2 * | 3/2015 | Yamaji ................. | B62D 25/025 296/181.2 |
| 2008/0252104 A1 | 10/2008 | Yamaguchi et al. | |
| 2014/0300141 A1 | 10/2014 | Hihara et al. | |
| 2016/0137046 A1 | 5/2016 | Song | |
| 2016/0375750 A1 * | 12/2016 | Hokazono ................ | B60K 1/04 180/68.5 |
| 2017/0036524 A1 * | 2/2017 | Ikeda ....................... | B60K 1/04 |

FOREIGN PATENT DOCUMENTS

| | | | |
|---|---|---|---|
| EP | 2778025 A1 | 9/2014 | |
| FR | 2866623 A1 * | 8/2005 | .......... B29C 70/088 |
| JP | 2002-120769 A | 4/2002 | |
| JP | 2008-174122 A | 7/2008 | |
| JP | 4788539 B2 | 10/2011 | |
| KR | 2011-0032501 A | 3/2011 | |
| WO | 2014/112265 A1 | 7/2014 | |

OTHER PUBLICATIONS

KR Lee, Ju Haeng etc., Comparison of Sound Transmission Loss Through Single and Double with Vacuum Layer Polymer Soundproof Panel, Int. J. Highw. Eng. vol. 15, No. 6: Dec. 11-15, 2013, http://dx.doi.org/10.7855/JHE2013.15.6.011.

* cited by examiner

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

A rear floor arrangement structure for a vehicle is provided. The rear floor arrangement structure includes a bottom part and a cross part that extends in a width direction of a vehicle body from one side of the bottom part. Additionally, a collision dispersion member is disposed at the bottom part and the cross part and the collision dispersion member extends along a collision direction of the vehicle body.

13 Claims, 7 Drawing Sheets

REAR FLOOR ARRANGEMENT STRUCTURE FOR VEHICLE

CROSS-REFERENCE TO RELATED APPLICATION

This application is based on and claims the benefit of priority to Korean Patent Application No. 10-2015-0143636, filed on Oct. 14, 2015 in the Korean Intellectual Property Office, the disclosure of which is incorporated herein in its entirety by reference.

TECHNICAL YIELD

The present disclosure relates to a rear floor arrangement structure for a vehicle, and more particularly, to a rear floor arrangement structure for a vehicle that improves aerodynamic efficiency and a transmission sound as well as effectively coping with a collision load.

BACKGROUND

Generally, a vehicle underbody includes a front floor disposed at a front of the vehicle and a rear floor disposed at a back of the vehicle. The rear floor arrangement structure of the vehicle may configure a lower portion of a trunk area of the vehicle. In particular, the floor arrangement (e.g., the floor structure) may be configured to support a spare tire accommodated in the trunk area, various other articles, or the like. In the case of eco-friendly vehicles such as an electric vehicle and a hybrid vehicle, a battery, a fuel tank, or the like may also be disposed to be adjacent to the rear floor.

Meanwhile, the existing rear floor of the related art includes various reinforcement structures to effectively cope with a rear collision. However, the the reinforcement structure may be complex. Further, the existing rear floor does not have a technical means for improving the problem of aerodynamic efficiency, a transmission sound, or the like of a vehicle.

SUMMARY

An aspect of the present disclosure provides a rear floor arrangement structure for a vehicle capable of improving aerodynamic efficiency as well as effectively coping with a collision load. Another aspect of the present disclosure provides a rear floor arrangement structure for a vehicle capable of blocking a transmission sound from being transferred into the vehicle as well as effectively coping with a collision load.

According to an exemplary embodiment of the present disclosure, a rear floor arrangement structure for a vehicle may include: a bottom part; a cross part that extends in a width direction of a vehicle body from one side of the bottom part; and a collision dispersion member disposed at the bottom part and the cross part, wherein the collision dispersion member may extend along a collision direction of the vehicle body and the collision dispersion member may be formed of a composite material in which a plurality of fibers and a resin are combined.

Particularly, the collision dispersion member may have at least one fiber layer in which a plurality of fibers are arranged in substantially an orthogonal direction to the collision direction. Further, the collision dispersion member may include at least one first fiber layer in which the plurality of fibers are arranged to be orthogonal to the collision direction and at least one second fiber layer in which the plurality of fibers may be arranged in parallel with the collision direction.

According to another exemplary embodiment of the present disclosure, a rear floor arrangement structure for a vehicle may include: a bottom part; a pair of side parts arranged at both sides of the bottom part; a cross part that extends by crossing the pair of side parts; and a collision dispersion part disposed at the bottom part and the cross part, in which the collision dispersion part may include a plurality of collision dispersion members disposed at the bottom part and the cross part to be spaced part from each other along a width direction of a vehicle body.

The collision dispersion member may include a first dispersion member disposed at the bottom part and a second dispersion member disposed at the cross member. The first dispersion member may be disposed at the bottom part to extend along a length direction of the vehicle body. An inside of the first dispersion member may include a hollow part and the hollow part may extend along a length direction of the first dispersion member. Both ends of the hollow part may be closed. Alternatively, both ends of the hollow part may be open. The second dispersion member may be bent to correspond to an outer surface of the cross part. A reinforcement member may be interposed between the first dispersion members and an inside of the reinforcement member may include a hollow part. The collision dispersion member and the reinforcement member may be formed of a composite material in which a fiber and a resin are combined. The bottom part, the cross part, and the side part may be formed as an integral structure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
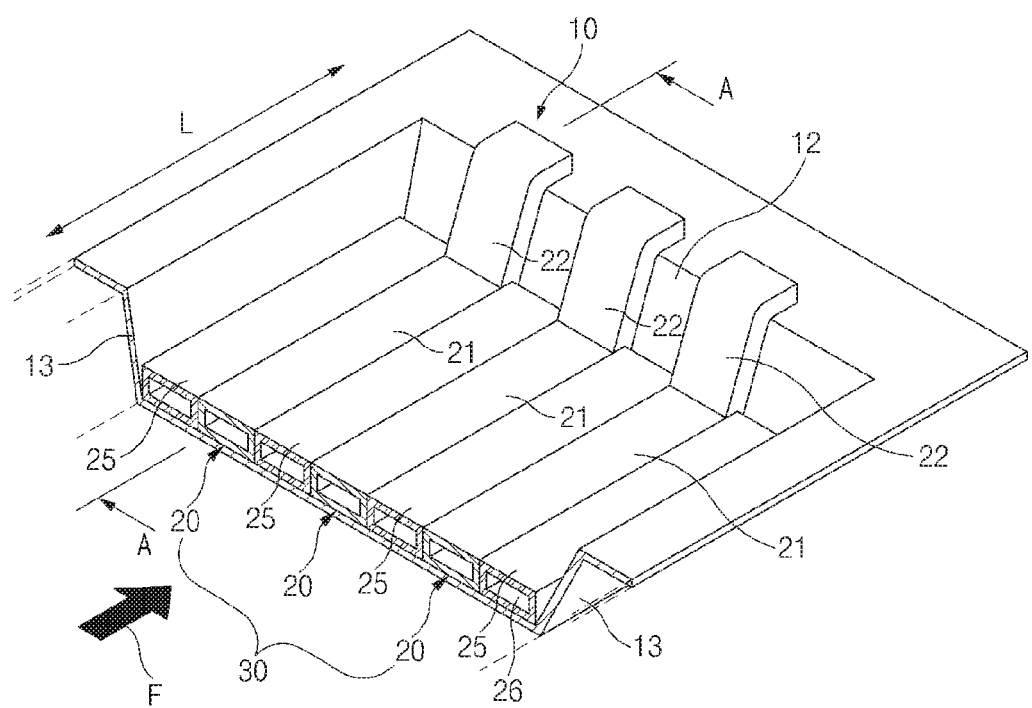
FIG. 1 is a view illustrating a portion of a rear floor arrangement structure for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. For reference, a size, a thickness of a line, and the like of components which are illustrated in the drawing referenced for describing exemplary embodiments of the present disclosure may be slightly exaggerated for convenience of understanding. Further, terms used to describe the present disclosure are defined in consideration of functions in the present disclosure and therefore may be changed based on an intention, a practice, and the like of a user and an operator. Therefore, the definition of the terminologies should be construed based on the contents throughout the specification.

Referring to FIG. 1, a rear floor arrangement structure 10 for a vehicle according to an exemplary embodiment of the present disclosure may include at least one bottom part 11, a pair of side parts 13 disposed at both sides of the bottom part 11, and a cross part 12 that extends to cross the pair of side parts 13. The bottom part 11 may be positioned to be lower than the side part 13 and the cross part 12 and the bottom part 11 may also form a recessed receiving space in which a battery, a spare tire, or the like along with the side part 13 and the cross part 12 may be disposed.

According to various exemplary embodiments, the bottom part 11, the side part 13, and the cross part 12 may be formed in one-piece, thus improving assembly performance and preventing the need for a paint sealer to be applied between parts. Further, the rear floor arrangement structure 10 for a vehicle according to the exemplary embodiment of the present disclosure may include a collision dispersion part 30 disposed to scatter a collision force corresponding to a collision direction F.

The collision dispersion part 30 may include at least one collision dispersion member 20 disposed along the collision direction F of a vehicle body. The collision direction F of the vehicle body corresponds to a length direction L of the vehicle body and thus the collision dispersion member 20 may extend along the length direction of the vehicle body. Accordingly, as the collision dispersion member 20 is extended along the length direction of the vehicle body, a function of a load path for the collision load may be effectively performed.

Figure 2A:
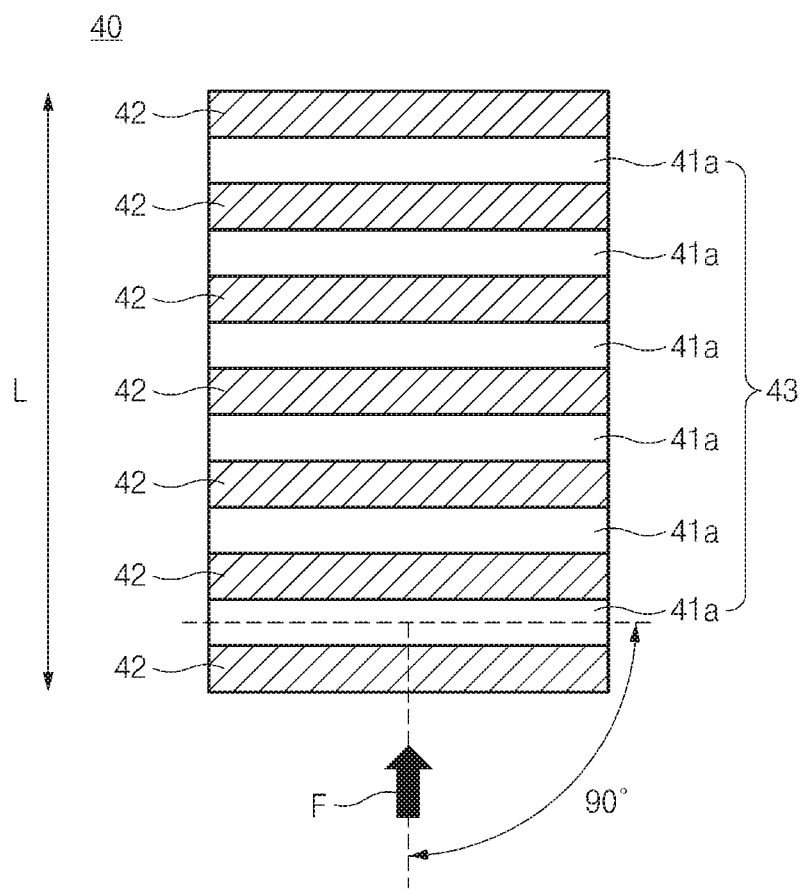
FIG. 2A and FIG. 2B are diagram illustrating a composite material forming a collision dispersion member of the rear floor arrangement structure for a vehicle according to the exemplary embodiment of the present disclosure.
Figure 2B:
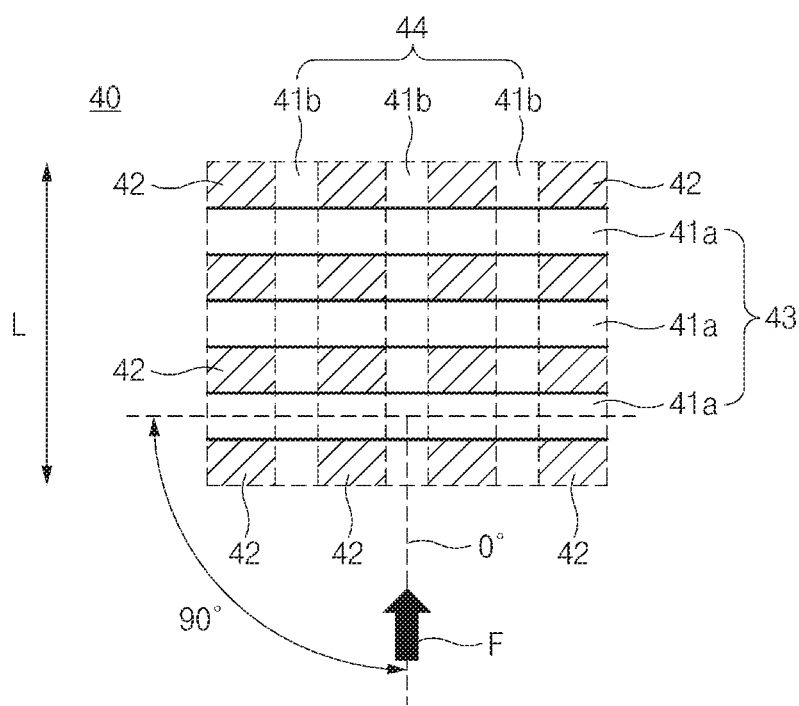

Meanwhile, as illustrated in FIG. 2A and FIG. 2B, the collision dispersion member 20 may be formed of a composite material 40 in which a plurality of fibers 41a and 41b and a resin 42 are combined. According to various exemplary embodiments, the fibers 41a and 41b may be formed of a continuous glass fiber. Further, compared to steel, the continuous glass fiber is light in weight and has excellent tensile strength. Accordingly, as the collision dispersion member 20 may be formed of the composite material having the fibers 41a and 41b, the collision load applied to the vehicle body may be more effectively dispersed (e.g., scattered).

According to various exemplary embodiments, as illustrated in FIG. 2A, the composite material 40 forming the collision dispersion member 20 may be formed in a structure in which a plurality of fiber layers 43 are stacked. The plurality of fibers 41a may be arranged in each fiber layer 43 in an orthogonal direction to the collision direction F of the vehicle body. Particularly, the collision direction F of the vehicle body corresponds to the length direction L of the vehicle body, and therefore the plurality of fibers 41a may be arranged to be orthogonal to the length direction L of the vehicle body.

Further, the fibers 41a may be impregnated in the resin 42 to secure an adhesion between the fibers 41a and a tensile strength of the resin 42 may range from about 100 to 500 MPa, but is not limited thereto. When an excessive collision load is applied, cracks may occur in the resin 42 and therefore an interfacial delamination may occur between the fibers 41a. Accordingly, to prevent the interfacial delamination, as illustrated in FIG. 2B, the composite material 40 may be formed in the structure in which at least one first fiber layer 43 having the plurality of fibers 41a arranged to be orthogonal to the collision direction and at least one second fiber layer 44 having the plurality of fibers 41b arranged to be parallel with the collision direction are stacked alternately. Accordingly, since the composite material 40 may be formed in the structure in which the fiber layers 43 and 44 orthogonal to each other are stacked alternately, the interfacial delamination between the fibers 41 and 41b may be prevented, thus improving the interfacial adhesion between the fibers.

Figure 3:
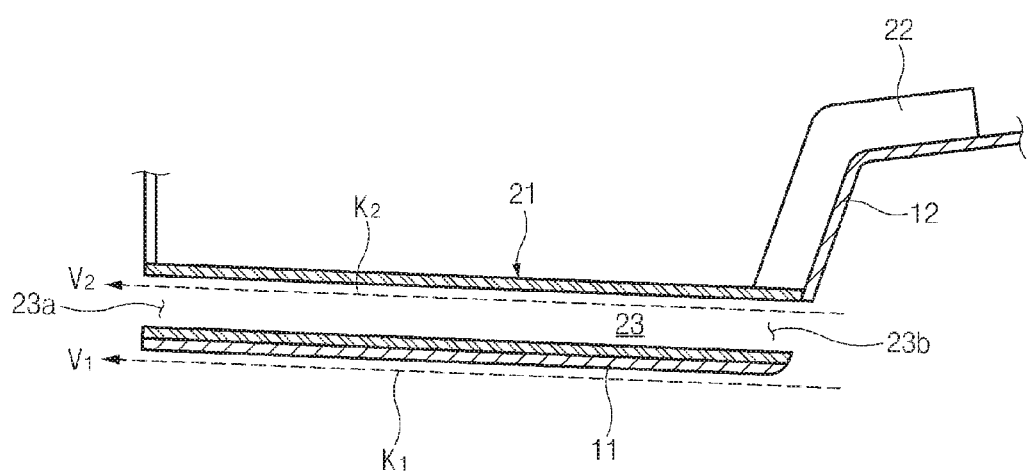
FIG. 3 is a cross-sectional view taken along line A-A' of FIG. 1 according to the exemplary embodiment of the present disclosure.

As illustrated in FIG. 3, each collision dispersion member 20 may include a first dispersion member 21 attached to the bottom part 11 and a second dispersion member 22 attached to the cross part 12. The first dispersion member 21 may extend lengthwise along the collision direction F on the bottom part 11. Accordingly, the first dispersion member 21 may extend along the collision direction F on the bottom part 11 to perform the function of the load path for the collision load when the collision load occurs. The second dispersion member 22 may be bent in a shape that corresponds to the cross part 12 to be firmly attached to the cross part 12.

Meanwhile, the plurality of collision dispersion members 20 may be disposed at the bottom part 11 and the cross part 12 to be spaced apart from each other along a width direction of a vehicle body. In particular, a reinforcement member 25 may be interposed between the first dispersion members 21 on the bottom part 11. The reinforcement member 25 may further improve the support rigidity between the first dispersion members 21. Additionally, the first dispersion member 21 may include a hollow part 23 (e.g., a hollow passage, a through-hole, or the like) formed therein. The hollow part 23 may extend lengthwise along the length direction of the first dispersion member 21. Similarly, an inside of the reinforcement member 25 may include a hollow part 26 (e.g., a hollow passage, a through-hole, or the like) and the hollow part 26 may extend lengthwise along the length direction of the reinforcement member 25.

According to the exemplary embodiment of FIG. 3, both ends of the first dispersion member 21 may include openings 23a and 23b and thus both ends of the hollow part 23 may be opened to an exterior. Accordingly, the hollow part 23 may operate as a path through which air may flow while a vehicle is driven. In particular, as illustrated in FIG. 3, the first dispersion member 21 may be inclined upward toward the rear of the vehicle, to thus improve the aerodynamic efficiency.

Figure 4:
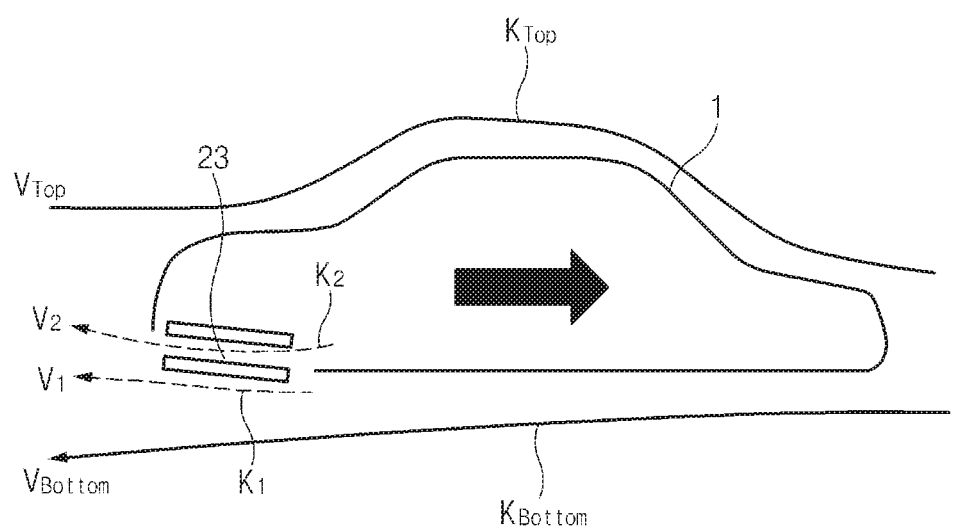
FIG. 4 is a diagram illustrating a state in which a collision dispersion member according to the exemplary embodiment of FIG. 3 is applied to a vehicle.

Referring to FIG. 4, an air flow path may be formed in an opposite direction to a driving direction of a vehicle 1 while the vehicle 1 is driven. In other words, a top air flow path $K_{TOP}$ may be formed along an upper surface of the vehicle 1 and a bottom air flow path $K_{BOTTOM}$ may be formed along the bottom of the vehicle 1. A drag equation based on the top air flow path $K_{TOP}$ and the bottom air flow path $K_{BOTTOM}$ is shown by the following Equation 1.

$$F_D = \frac{1}{2}e(V_{TOP} - V_{BOTTOM})^2 C_D A \qquad \text{Equation 1}$$

wherein, $F_D$ represents a drag force, $C_D$ represents a drag coefficient, A represents an area, e represents a density, $V_{TOP}$ represent a velocity of the top air flow $K_{TOP}$, and $V_{BOTTOM}$ represents a velocity of the bottom air flow $K_{BOTTOM}$.

Moreover, according to the exemplary embodiment of the present disclosure, a first air flow path $K_1$ may be formed along a bottom surface of the first dispersion member 21 and a second air flow path $K_2$ passing through the inside of the hollow part 23 may be formed. Further, velocities between the air flow paths $K_{TOP}$, $K_{BOTTOM}$, $K_1$, $K_2$ may be formed in an order of $V_{TOP} \gg V_1 > V_2 \gg V_{BOTTOM}$ due to the structural height difference. According to the exemplary embodiment of the present disclosure, the first and second air flow paths $K_1$ and $K_2$ may be additionally formed through the opened hollow part 23 of the first dispersion member 21, and thus the drag equation as shown in the following Equation 2 may be used.

$$F_D = \frac{1}{2}e(V_{TOP} - V_1 - V_2 - V_{BOTTOM})^2 C_D A \qquad \text{Equation 2}$$

wherein, $F_D$ represents a drag force, $C_D$ represents a drag coefficient, A represents an area, e represents a density, $V_{TOP}$ represents a velocity of the top air flow $K_{TOP}$, $V_{BOTTOM}$ represents a velocity of the bottom air flow $K_{BOTTOM}$, $V_1$ represents a velocity of the first air flow $K_1$, and $V_2$ represents a velocity of the second air flow $K_2$.

As described above, Equation 2 shows that the drag force may be reduced and thus the aerodynamic efficiency may be improved. According to the exemplary embodiment of the present disclosure, using the structure in which both ends of the hollow part 23 are opened, the aerodynamic efficiency may be improved while the vehicle is driven. Further, the hollow part 26 of the reinforcement member 25 may be formed in the structure in which both ends of the hollow part 26 are opened, thus further improving the aerodynamic efficiency of the vehicle.

Figure 5:
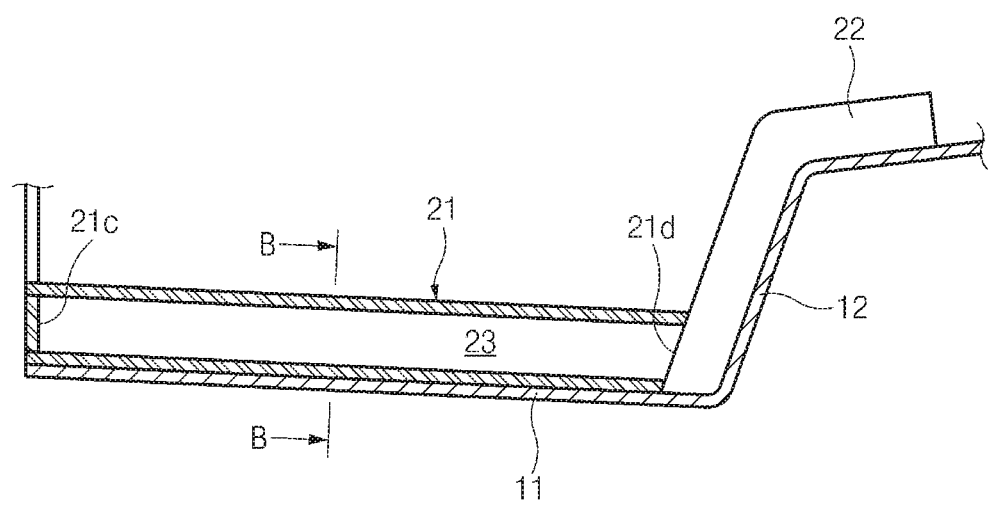
FIG. 5 is a diagram illustrating a modified example of FIG. 3 according to the exemplary embodiment of the present disclosure.

FIG. 5 is a cross-sectional view of a collision dispersion member according to another exemplary embodiment of the present disclosure. According to the exemplary embodiment of FIG. 5, both ends of the first dispersion member 21 of the collision dispersion member 20 may include closed parts 21c and 21d (e.g., closed end plates), thus closing the hollow part 23 of the first dispersion member 21 to operate as a closed air layer. Further, both ends of the reinforcement member 25 may be closed, and thus the hollow part 26 of the reinforcement member 25 may operate as the closed air layer.

Figure 6:
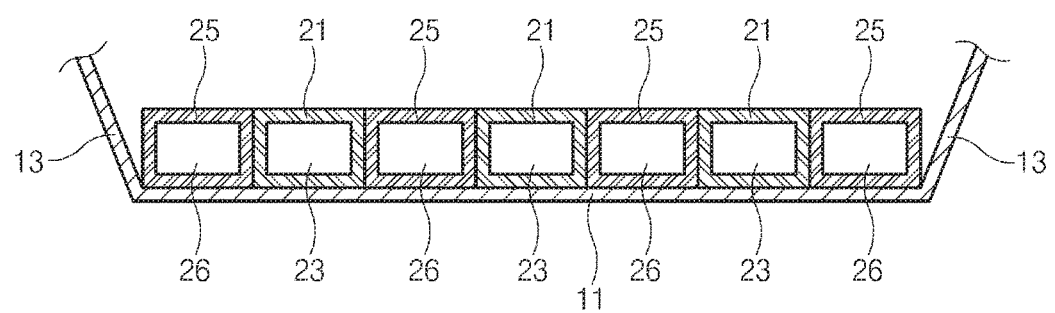
FIG. 6 is a cross-sectional view taken along line B-B' of FIG. 5 according to the exemplary embodiment of the present disclosure.

Therefore, as illustrated in FIG. 6, the plurality of air layers may be formed at the bottom part 11 of the rear floor arrangement structure 10 by the hollow part 23 of the first dispersion member 21 and the hollow part 26 of the reinforcement member 25, to thus gradually reduce the transmission sound propagated from the exterior of the vehicle when transferred into the vehicle.

According to the exemplary embodiments of the present disclosure, it may be possible to effectively cope with the collision load by at least one collision dispersion member that extends lengthwise along the collision direction and the aerodynamic efficiency may be improved by having at least a portion of the collision dispersion member open to the exterior. Further, according to the exemplary embodiments of the present disclosure, it may be possible to block the transmission sound from being transmitted into the vehicle by forming the closed air layer in the collision dispersion member.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A rear floor arrangement structure for a vehicle, comprising:
   a bottom part;
   a cross part that extends in a width direction of a vehicle body from one side of the bottom part;
   a plurality of collision dispersion members disposed at the bottom part and the cross part and having a pair of opposing faces; and
   a plurality of reinforcement members interposed between the plurality of collision dispersion members and having a pair of opposing faces adjacent to the pair of the opposing faces of the plurality of the collision dispersion members
   wherein the plurality of collision dispersion members extend along a collision direction of the vehicle body, wherein the plurality of collision dispersion members are formed of a composite material in which a plurality of fibers and a resin are combined, and
   wherein each one of the pair of the opposing faces of the plurality of reinforcement members is in contact with one of the pair of opposing faces of the plurality of collision dispersion members.

2. The rear floor arrangement structure for a vehicle according to claim 1, wherein the collision dispersion member has at least one fiber layer in which a plurality of fibers are arranged in an orthogonal direction to the collision direction.

3. The rear floor arrangement structure for a vehicle according to claim 1, wherein the collision dispersion member includes at least one first fiber layer in which the plurality of fibers are arranged to be orthogonal to the collision direction and at least one second fiber layer in which the plurality of fibers is arranged in parallel with the collision direction.

4. A rear floor arrangement structure for a vehicle, comprising:
a bottom part;
a pair of side parts disposed at both sides of the bottom part;
a cross part that extends by crossing the pair of side parts;
a plurality of collision dispersion members disposed at the bottom part and the cross part to be spaced part from each other along a width direction of a vehicle body, and having a pair of opposing faces; and
a plurality of reinforcement members interposed between the plurality of collision dispersion members and having a pair of opposing faces adjacent to the pair of the opposing faces of the plurality of the collision dispersion members,
wherein each one of the pair of the opposing faces of the plurality of reinforcement members is in contact with one of the pair of opposing faces of the plurality of collision dispersion members.

5. The rear floor arrangement structure for a vehicle according to claim 4, wherein each one of the plurality of collision dispersion member includes a first dispersion member disposed at the bottom part and a second dispersion member disposed at the cross part.

6. The rear floor arrangement structure for a vehicle according to claim 5, wherein the first dispersion member is disposed at the bottom part to extend along a length direction of the vehicle body.

7. The rear floor arrangement structure for a vehicle according to claim 6, wherein an inside of the first dispersion member includes a hollow part that extends along a length direction of the first dispersion member.

8. The rear floor arrangement structure for a vehicle according to claim 7, wherein both ends of the hollow part are closed.

9. The rear floor arrangement structure for a vehicle according to claim 7, wherein both ends of the hollow part are open.

10. The rear floor arrangement for a vehicle according to claim 5, wherein the second dispersion member is bent to correspond to an outer surface of the cross part.

11. The rear floor arrangement structure for a vehicle according to claim 5, wherein each one of the plurality of reinforcement members is interposed between the first dispersion members and an inside of the reinforcement member includes a hollow part.

12. The rear floor arrangement structure for a vehicle according to claim 4, wherein the plurality of collision dispersion members and the plurality of reinforcement members are formed of a composite material in which a fiber and a resin are combined.

13. The rear floor arrangement structure for a vehicle according to claim 4, wherein the bottom part, the cross part, and the side part are formed in an integral structure.

* * * * *